United States Patent [19]

Peetz et al.

[11] 4,258,808
[45] Mar. 31, 1981

[54] ROCK DRILL

[75] Inventors: Wolfgang Peetz, Blitzenreute; Siegfried Klaissle, Unterankenreute, both of Fed. Rep. of Germany

[73] Assignee: Hawera Probst GmbH & Co., Ravensburg, Fed. Rep. of Germany

[21] Appl. No.: 16,131

[22] Filed: Mar. 1, 1979

[30] Foreign Application Priority Data

Mar. 2, 1978 [DE] Fed. Rep. of Germany ....... 2808885

[51] Int. Cl.³ ............................................ E21B 10/44
[52] U.S. Cl. .................................. 175/394; 175/410; 175/404
[58] Field of Search .............. 175/60, 387, 394, 395, 175/403, 404, 405, 333, 45

[56] References Cited

U.S. PATENT DOCUMENTS

| 218,374 | 8/1879 | Fishburn | 175/394 |
| 831,056 | 9/1906 | Gilmore | 175/333 |
| 1,218,579 | 3/1917 | Overman | 175/405 X |
| 1,882,906 | 10/1932 | Renfer | 175/405 X |
| 2,579,712 | 12/1951 | Tilden | 175/403 X |
| 2,594,256 | 4/1952 | Compton | 175/404 X |
| 2,844,358 | 7/1958 | Eberman et al. | 175/404 X |
| 3,130,763 | 4/1964 | Schlosser et al. | 175/405 X |
| 3,216,153 | 11/1965 | Saville et al. | 175/403 X |
| 3,888,320 | 6/1975 | Maxwell | 175/394 |

FOREIGN PATENT DOCUMENTS

| 319067 | 11/1902 | France | 175/405 |
| 202342 | 12/1922 | United Kingdom | 175/403 |
| 339426 | 12/1930 | United Kingdom | 175/394 |
| 685967 | 1/1953 | United Kingdom | 175/404 |

Primary Examiner—James A. Leppink
Assistant Examiner—Richard E. Favreau
Attorney, Agent, or Firm—Becker & Becker, Inc.

[57] ABSTRACT

A rock drill, particularly for reinforced concrete, for rotary blow drilling, having one or several helical removal grooves for the removal of drill dust and a drill head furnished with a hard metal cutting ring is disclosed. In a preferred embodiment, the drill shaft is provided with a removal channel communicating the cutting ring head and a removal groove in the drill shaft surface.

19 Claims, 5 Drawing Figures

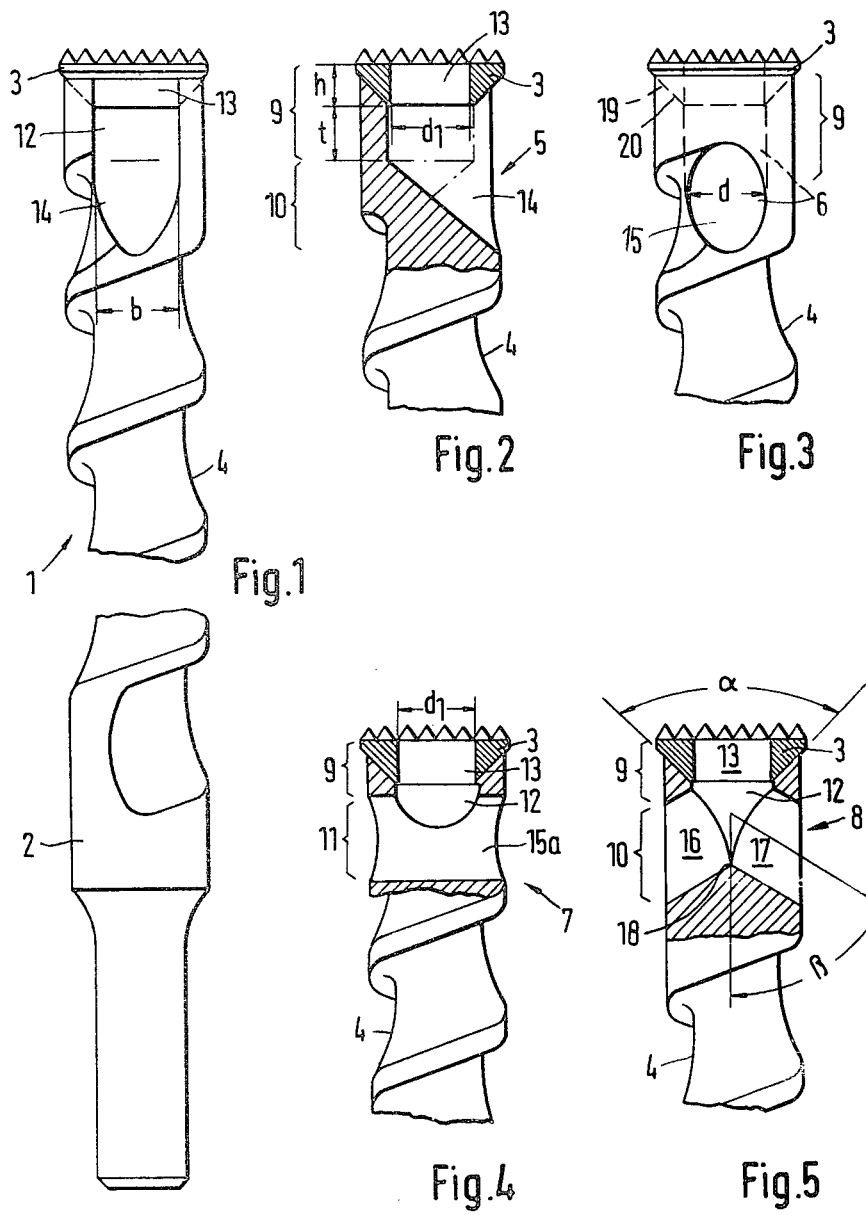

ROCK DRILL

The present invention relates to a drill, particularly rock drill, for rotary blow drilling of material such as reinforced concrete, the drill having one or more helical grooves formed in the drill shaft surface for the removal of drilling dust as well as a drill head furnished with a hard metal cutting ring.

Rock drills having helical drilling dust removal grooves in the drill shaft surface are known. Such drills are furnished with a cutting head and with hard metal cutting edges which are formed by a cutting plate. The material removed or comminuted by the drilling action of the hard metal cutting edges is upwardly flowingly removed through the removal grooves. This drilling action provides for removal over the entire drill hole cross-sectional area; thus, "full" drilling is carried out.

It is an object of the present invention to provide a drill with which a "full" drilling in rock, concrete or similar material can be carried out while expending a low removal energy.

This object and other objects and advantages of the invention will appear more clearly from the following specification in connection with the accompanying drawing, in which:

FIG. 1 shows a side elevational view of a drill in accordance with one embodiment of the invention;

FIG. 2 is a side elevational view in accordance with FIG. 1 partially in section;

FIG. 3 shows a further embodiment of the drill in accordance with the present invention;

FIG. 4 is yet another embodiment, partly in section; and

FIG. 5 is still another embodiment, partly in section.

In accordance with the present invention there is provided a drill which comprises a drill dust removal channel which extends in the drill shaft from the cutting ring head and leads into the drill dust removal groove in the drill shaft surface. Furthermore, in accordance with the invention, it is contemplated that the removal channel comprises a centric region and adjacent thereto an inclined and/or horizontally extending section which leads into the removal groove of the drill shaft. The centric region of the removal channel can be formed by a bore in the shaft as well as by the aperture in the cutting ring head.

In another embodiment the channel is in the inclined and/or horizontal section in the form of a slot or in the form of a bore. In order to ensure flowing removal of drilling dust, the slot or the bore, respectively have a width or diameter, respectively, which is equal to or greater than the diameter of the aperture in the cutting ring head. In accordance with another embodiment, the channel comprises a bore, adjacent to the central bore, which first mentioned bore extends perpendicularly with respect to the longitudinal axis and communicates opposite sides of the drill shaft, the diameter of the transverse bore being equal to or greater than the aperture of the cutting ring head. The transverse bore can be provided by two oppositely extending bores which enter the central bore at an angle with respect to the longitudinal central axis. Such bilateral bore embodiment is particularly preferred for helical or double helical drill shafts. In the region of coincidence of the two transverse bores there is provided a wedge-type cutting edge. This edge can fracture remaining drill core material which is then removed without interference through the helical removal grooves. The hard metal cutting ring is secured to the operating end of the drill shaft by a hard soldering whereby the cutting ring head includes a conical lower end portion which is insertable into a matchingly formed conical depression at the operating end of the drill shaft. Thus, at the location of soldering or interface of the annular cutting head and the operating drill shaft end, an optimum force transmission of axial forces resulting from the impact of the drill hammer, and of tangential forces resulting from the rotary movement of the drill, is achieved. It is furthermore contemplated in accordance with the invention that the bore of the channel in the cutting ring head or annular cutting head has a depth of from 1 to 3 times the height of the cutting ring. This relationship provides the advantage that severed reinforcing pieces can be received and removed or expelled through the lateral exit openings of the bores.

The advantages primarily afforded by the invention reside therein that bore holes in the lower region of 10 to 25 mm diameter can now be formed by the particular configuration of the drill with a lower removal effort, particularly when working in reinforced concrete. Rock material remaining in the centric removal channel is directed through the channel to the removal groove and together transported in an upward direction out of the drill bore.

Turning now to the embodiments shown in the drawing, the embodiment shown in FIG. 1 comprises a drill 1 having a shaft 2 and a cutting ring head 3 formed of hard metal. In the surface of shaft 2 one or several helical removal grooves are provided. The drill shaft 2 comprises a removal channel 5, 6, 7 and 8 which extends from the cutting ring head 3 to the surface of the shaft 2 and which leads into the helical removal groove 4.

The removal channel includes a centrical region 9 and a section 10 which branches therefrom and extends to the shaft surface. In the central region 9 the channel 5 is comprised of bore 12 in shaft 2 and bore 13 in cutting ring head 3. These bores or apertures 12 and 13 are followed, in accordance with the embodiment shown in FIGS. 1 and 2, by a slot 14 or a bore 15 (FIG. 3). The width b of the slot 14, respectively, the diameter d of bore 15 are preferably equal or greater than the diameter $d_1$ of bore 13 in the cutting ring head 3. The slot 14, as well as the bore 15, extend somewhat slanted with respect to the central bore 12.

In accordance with a further embodiment shown in FIG. 4, the bore 12 extends into a through-bore 15a extending transversely with respect to the longitudinal axis of the bore shaft 2, whereby the through-bore 15a also leads on both sides of the shaft 2 respectively into a removal groove 4. The transverse throughbore 15a has a diameter which is preferably equal to or greater than the diameter $d_1$ of bore 13 in the cutting ring head 3.

The transverse bore can also be provided by two oppositely arranged bores 16 and 17, FIG. 5. These bores 16 and 17 each extend at an angle $\beta$ into central bore 12. Inclination of these transverse bores 16 and 17 is with respect to the operating end of the shaft 2. In the region of convergence of the two bores 16 and 17, there is centrally with respect to the central bore 12 provided a wedge-like and wedge operating edge 18.

For securing the cutting crown 3 on shaft 2, the cutting crown 3 is provided with a conical end 19 which is adapted to be inserted in and secured to the conical aperture 20 of drill shaft 2. Both parts are joined by hard soldering. The angle α of the conical interface is between 60° and 150°, preferably about 90°.

The annular cutting head may comprise, for example, an alloy of tungsten carbide and cobalt, such at 95% tungsten carbide and 5% cobalt alloy, or an 88% tungsten carbide and a 12% cobalt alloy.

It is, of course, to be understood that the present invention is in no way restricted to the specific disclosure of the specification or drawing, but also encompasses any modifications within the scope of the appended claims.

What we claim is:

1. A drill for rotary blow drilling into dense material, particularly rock and reinforced concrete, said drill comprising in combination:
    a shaft portion having at least one helical groove for removal of drill dust generated during drilling, said at least one groove being helically disposed about the outer surface of said shaft portion;
    an annular cutting head connected to said shaft portion, said cutting head including a hard metal cutting ring with a bore of predetermined diameter; and
    drill-dust-removal channel means in said shaft portion for communicating between said annular cutting head near said hard metal cutting ring and said at least one helical groove, said channel means having an open width at least equal to diameter of the bore in said hard metal cutting ring.

2. A drill in combination according to claim 1, wherein said drill-dust-removing channel means includes:
    a centric region, the longitudinal central axis of which coincides with the longitudinal central axis of said drill; and
    a transverse section communicating with said centric region and said helical groove and including discharge openings at opposite ends of said transverse section communicating with said helical groove.

3. A drill in combination according to claim 1, wherein said single drill-dust-removing channel means includes:
    a centric region, the longitudinal central axis of which coincides with the longitudinal central axis of the drill; and
    a sloped end section communicating with said centric region and said helical groove, said sloped end section extending downwardly in a direction toward said hard metal cutting ring.

4. A drill in combination according to claim 1, wherein said annular cutting head is secured to said drill shaft portion by hard soldering.

5. A drill in combination according to claim 1, wherein said channel means includes a centric region comprised of a first bore in said shaft portion and a second bore in said annular cutting head.

6. A drill in combination according to claim 5, wherein said first bore has a depth which is from one to three times the height of said annular cutting head.

7. A drill in combination according to claim 5, wherein said channel means includes two oblique bores.

8. A drill in combination according to claim 7, wherein the diameter of each oblique bore is at least equal to the diameter of said second bore in said annular cutting head.

9. A drill in combination according to claim 5, wherein said channel means includes a slot.

10. A drill in combination according to claim 5, wherein the width of said slot is at least equal to the diameter of said second bore in said annular cutting head.

11. A drill in combination according to claim 5, wherein said channel means includes a transverse bore.

12. A drill in combination according to claim 8, wherein the diameter of said transverse bore is at least equal to the diameter of said second bore in said annular cutting head.

13. A drill in combination according to claim 5, wherein said channel means includes a transverse bore communicating opposed sides of said drill shaft portion.

14. A drill in combination according to claim 13, wherein said diameter of said transverse bore is at least equal to the diameter of said second bore in said annular cutting head.

15. A drill in combination according to claim 12, wherein said transverse bore is formed by two obliquely disposed bores which are positioned at an angle with respect to the longitudinal central axis of said drill shaft portion.

16. A drill in combination according to claim 13, wherein said two oblique bores provide a chisel wedge-like central cutting edge.

17. A drill in combination according to claim 14, wherein the apex of the edge is coincidental with the longitudinal central axis of the drill and points downward towards the cutting plane of said annular cutting ring.

18. A drill in combination according to claim 1, wherein said annular cutting head includes a conical terminus securable in a conical depression formed at the operating end of said drill shaft portion.

19. A drill in combination according to claim 18, wherein the conical walls in interface relationship embrace an angle of from 60° to 150°.

* * * * *